Aug. 19, 1958   W. H. RUSHFORD   2,848,347
WET OIL-WATER EMULSION PELLETING OF CARBON BLACK
Filed Dec. 28, 1953
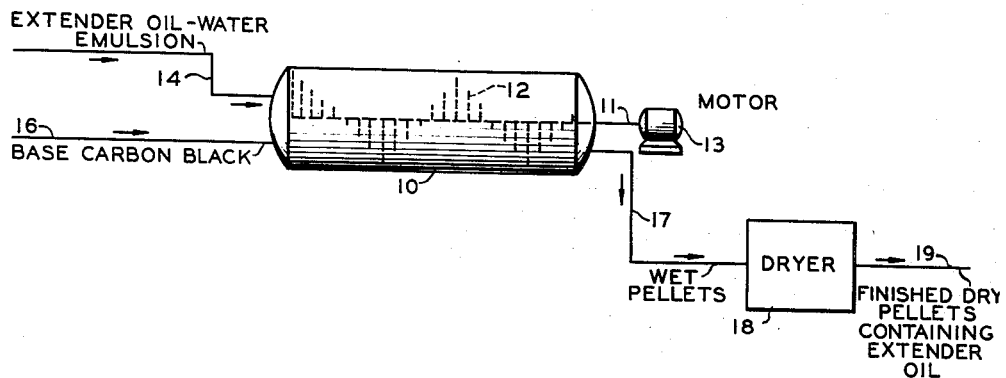
INVENTOR.
W.H. RUSHFORD
BY Hudson 3d Young
ATTORNEYS

| United States Patent Office | 2,848,347
Patented Aug. 19, 1958 |

2,848,347

WET OIL-WATER EMULSION PELLETING OF CARBON BLACK

Wilson H. Rushford, Borger, Tex., assignor to Phillips Petroleum Company, a corporation of Delaware Application December 28, 1953, Serial No. 400,624

7 Claims. (Cl. 106—307)

This invention relates to a process for simultaneously pelleting and incorporating extender oil in flocculent carbon black.

The use of carbon black pellets in various applications in industry is facilitated by the presence in the carbon black of a specific amount of oil. In one process of preparing a particular type of rubber an oil content of about 9 percent is required and it has been found impossible by prior art methods to obtain the desired ratio of oil to black within ± one percent of the required oil concentration in the form of pellets of uniform oil concentration. In one prior art method the oil is sprayed onto the loose black as it is being pelleted, but it has not been possible to control the impregnation of the black in this manner within the accuracy required in most commerical processes. In attempting to spray the oil onto the preformed carbon black pellets so as to impregnate the pellets with a specific amount of oil it has been found possible to control the ratio of oil to carbon black within limits of from 1–2 weight percent, but this is not sufficiently accurate for many commercial uses.

When adding oil to the preformed pellets the oil is sprayed onto the surface of the pellets and some receive more oil than others which results in a non-uniform mixture of oil and carbon black. Such a non-uniform mixture requires more processing when blending the oiled carbon black with rubber. It has also been found possible to pellet carbon black in so-called pug mills, but when practicing this method it is necessary to add considerably more than the desired amount of oil to the carbon black in order to obtain pellets and to facilitate rapid pelleting of the black. As a result, the pellets made in this manner not only contain more than the desired amount of oil, but the pellets have been found too hard to be easily blended with rubber.

An object of the invention is to provide an improved method of pelleting carbon black. Another object of the invention is to provide a method of incorporating a definite amount of an oil in pelleted carbon black. A further object is to provide a simple and efficient method of simultaneously pelleting and incorporating an exact proportion of an extender oil in carbon black. Other objects will become apparent from a consideration of the accompanying disclosure.

I have found that flocculent carbon black can be pelleted by admixing with the black a sufficient quantity of a water-oil emulsion to permit wet pelleting of the black. The desired amount of oil is incorporated in the carbon black by controlling the concentration of the oil in the emulsion and the ratio of emulsion to carbon black. The pellets are produced in a pug mill or in other wet pelleting apparatus by mixing a suitable water-oil emulsion with the black and agitating the wet mixture, usually by rolling and tumbling, until the pellets are formed. The ratio of emulsion to flocculent black must be controlled within narrow limits in order to obtain pellets which appear dry and to permit rapid pelleting. If the ratio of emulsion exceeds the narrow permissible limits, the mass of carbon black containing the emulsion becomes carbon black mud or a plastic mass which is not amenable to pelleting. On the other hand, if the ratio of the emulsion to the carbon black is below the required narrow limits for the particular black being pelleted, the pelleting is so slow as to be impractical.

It has been found that with a water-oil emulsion containing oil in a concentration of 1 to 90 weight percent various types of carbon blacks have optimum pelleting conditions somewhere in the range of 40 to 56 weight percent of emulsion in the mixture of carbon black and emulsion. This optimum water-oil emulsion content of the mixture varies in accordance with the concentration of oil in the emulsion. In instances where the concentration of oil in the emulsion is low the optimum emulsion content is in the upper part of the range of 40 to 56 percent, while the optimum content is in the lower part of the range when pelleting with an emulsion containing more oil than water. It has also been found that once the optimum emulsion content for a specific concentration of the oil in the emulsion has been established successful pelleting may be effected with an emulsion content in the mixture which varies over a range of 5 weight percent, the optimum emulsion content being taken as the median of the range.

The term "extender oil" is used in the rubber compounding art to designate any oil that has extending properties when included in a rubber recipe. Various paraffinic, aromatic, and naphthenic heavy oils have been found useful as extenders. The use of any type of oil which can be successfully used, when incorporated in an emulsion with water, to rapidly pellet carbon black is within the scope of the invention.

To illustrate the invention, a certain carbon black exhibits optimum pelleting conditions when using a water-oil emulsion containing 90 percent oil with 44 weight percent emulsion in the mixture of carbon black and emulsion. The carbon black can then be efficiently pelleted so as to form apparently dry pellets with an emulsion content ranging from 41.5 to 46.5 weight percent of the total mixture. Another type of carbon black may pellet best when utilizing a water-oil emulsion containing only 1 percent oil with an emulsion content of 56 percent. This carbon black will then pellet satisfactorily with an emulsion content in the range of 53.5 to 58.5 weight percent. It therefore can be readily seen that by regulating the concentration of oil in the emulsion within the range of 1–90 percent of the emulsion so as to deposit in the carbon black the desired proportion of oil and mixing with the carbon black an amount of emulsion which is within 2½ weight percent of the optimum content, the carbon black can be rapidly pelleted so as to impregnate the pellets with a specific amount of oil. Of course, it must be realized that the proportion of oil in the emulsion and the emulsion content of the mixture being pelleted must be correlated so as to provide the proper concentration of oil.

After the pellets have been formed in accordance with the invention, the water absorbed and held by the pellets is removed by heating the same to a temperature above 212° F. so as to drive off the water. In most instances substaintially all of the water should be removed, while in instances where the use of the carbon black requires a small percentage of water this can be readily adjusted during the heating of the pellets.

In the practice of the invention loose carbon black can be pelleted at an extremely rapid rate with a very small amount of equipment and with a minimum of power. It is believed that the uniformity of impregnation of the pellets with oil is due in a considerable part to the substantially complete wetting of the carbon black and the formation of a homogeneous mixture during the pelleting process. The pellets formed have a definite predetermined ratio of oil to black which can be readily duplicated by the process of the invention. The uniform distribution of the oil in the pellets facilitates the blending of the carbon black with rubber.

When preparing the emulsion it is desirable to use an emulsifier. The emulsifier is selected from well-known emulsifying agents which are either useful ingredients in the compounding or master-batching of rubber or which are non-deleterious in the manufacture of rubber and in the rubber itself. The emulsifier may be selected from the alkylsulfonates, the alkylarylsulfonates, the ligninsulfonates, rosin acid soaps, and condensation products of alkylphenols and ethylene oxide. Other emulsifying agents which are suitable are listed in U. S. Patent 2,639,225. It is also feasible to incorporate in the carbon black-emulsion mix other ingredients of rubber compounding recipes in the minor amounts required in the recipes where they do not interfere with the pelleting process.

To further illustrate the invention, reference may be had to the drawing which presents a flow of one modification of the process of the invention. A pug mill or pelleting drum 10 has an axial shaft 11 having disposed thereon inside the drum agitators or beaters 12. A motor 13 or other suitable power source is utilized to drive the mill. The extender oil-water emulsion is introduced to the mill through line 14 and is mixed with carbon black entering the mill through line 16. The pellets egress from the mill through line 17 and are introduced to drier 18 in which suitable drying conditions are maintained so as to pass the pellets in dry condition or containing any suitable predetermined amount of moisture to line 19 for delivery to storage or point of use.

Any suitable pelleting device may be utilized as mill 10 and, likewise, any suitable drier may be used as drier 18.

*Example*

An emulsion containing 134 pounds of water, 138 pounds of Circosol 2xH, 27.6 pounds of oleic acid, and 0.42 pound of sodium hydroxide was mixed in a pelleting mill with 417 pounds Philblack so as to produce apparently dry pellets. The pellets containing the water and oil were dried so as to remove substantially all of the water. This left 33 parts of oil per 100 parts of black in the pellets which were uniformly impregnated with 24.8 percent oil.

Addition of extender oil during pelleting improves the handling characteristics and also improves certain rubber properties, particularly modulus. Another advantage lies in the fact that mixed-batch weight losses are less in instances where these oiled-pellets are used.

Numerous modifications of the invention can be made within the scope of the preceding disclosure. It should be realized that the illustrative details set forth herein are merely explanatory and should not be construed as unnecessarily limiting the invention.

I claim:

1. A process for simultaneously pelleting and incorporating an extender oil in flocculent carbon black which pellets most efficiently with an optimum water-oil emulsion content in the range of 40 to 56 weight percent of the total mixture, which comprises establishing the optimum water-oil emulsion content for most efficiently pelleting said black with a given oil content in the range of 1 to 90 weight percent of the emulsion by subjecting said black to pelleting agitation in admixture with different amounts of said water-oil emulsion in the range of 40 to 56 weight percent of the black-emulsion mixture to ascertain the emulsion content which effects the most rapid pelleting of said black; thereafter pelleting said black by mixing therewith an amount of water-oil emulsion within 2.5 weight percent of said optimum content and agitating the mixture to form apparently dry pellets of uniform oil content, the oil in said emulsion being in the range of 1 to 90 weight percent of the emulsion; and removing substantially all of the water from the resulting pellets by heating same to a temperature above 212° F.

2. The process of claim 1 including incorporation of an emulsifying agent in minor but emulsifying amount in the water-oil mixture.

3. The process of claim 1 in which said agitating is effected in a horizontally elongated cylindrical tumbling zone rotating on a substantially horizontal axis.

4. The process of claim 1 including proportioning the oil and water in said emulsion so as to impregnate the pellets with a predetermined amount of oil in the range of 1 to 40 weight percent of the pellets.

5. A process for simultaneously pelleting and incorporating an extender oil in flocculent carbon black which comprises pelleting said black by mixing therewith an amount of a water-oil emulsion within 2.5 weight percent of a predetermined optimum concentration in the range of 40 to 56 weight percent of the resulting mixture so as to form a homogeneous mixture, the oil content of said emulsion being in the range of 1 to 90 weight percent of the emulsion, said optimum concentration being determined by subjecting said black to pelleting agitation in admixture with different amounts of said water-oil emulsion in the range of 40 to 56 weight percent of the black-emulsion mixture to ascertain the emulsion content which effects the most rapid pelleting; agitating said mixture to form apparently dry pellets; and removing substantially all of the water from said pellets.

6. A process comprising pelleting carbon black by mixing therewith an amount of a water-oil emulsion within 2.5 weight percent of a predetermined optimum concentration in the range of 40 to 56 weight percent of the resulting mixture so as to form a homogeneous mixture, the oil content of said emulsion being in the range of 1 to 90 weight percent of the emulsion, said optimum concentration being determined by subjecting said black to pelleting agitation in admixture with different amounts of said water-oil emulsion in the range of 40 to 56 weight percent of the black-emulsion mixture to ascertain the emulsion content which effects the most rapid pelleting; agitating said mixture to form apparently dry pellets; and removing substantially all of the water from said pellets.

7. The process of claim 5 wherein the loose carbon black and water-oil emulsion are continuously fed into one end of a horizontally elongated cylindrical pellet mill rotating on its horizontal axis and the apparently dry pellets are continuously withdrawn from the downstream end of the mill and are continuously passed to a drying zone.

References Cited in the file of this patent
UNITED STATES PATENTS

| | | |
|---|---|---|
| 1,651,733 | Sheppard et al. | Dec. 6, 1927 |
| 1,889,429 | Wiegand | Nov. 29, 1932 |
| 2,040,770 | Grote | May 12, 1936 |
| 2,167,674 | Offutt | Aug. 1, 1939 |
| 2,635,057 | Jordan | Apr. 14, 1953 |